UNITED STATES PATENT OFFICE.

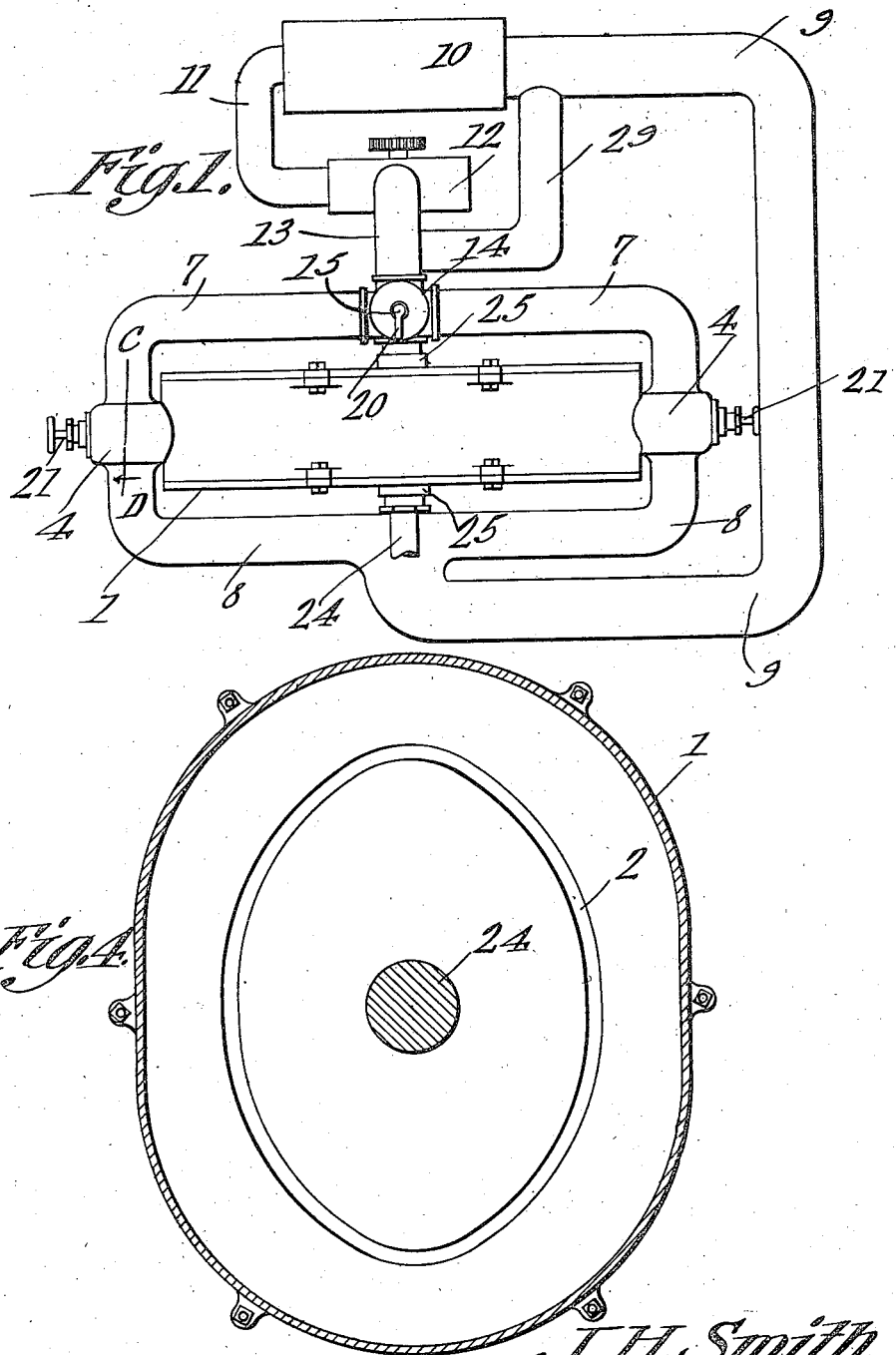

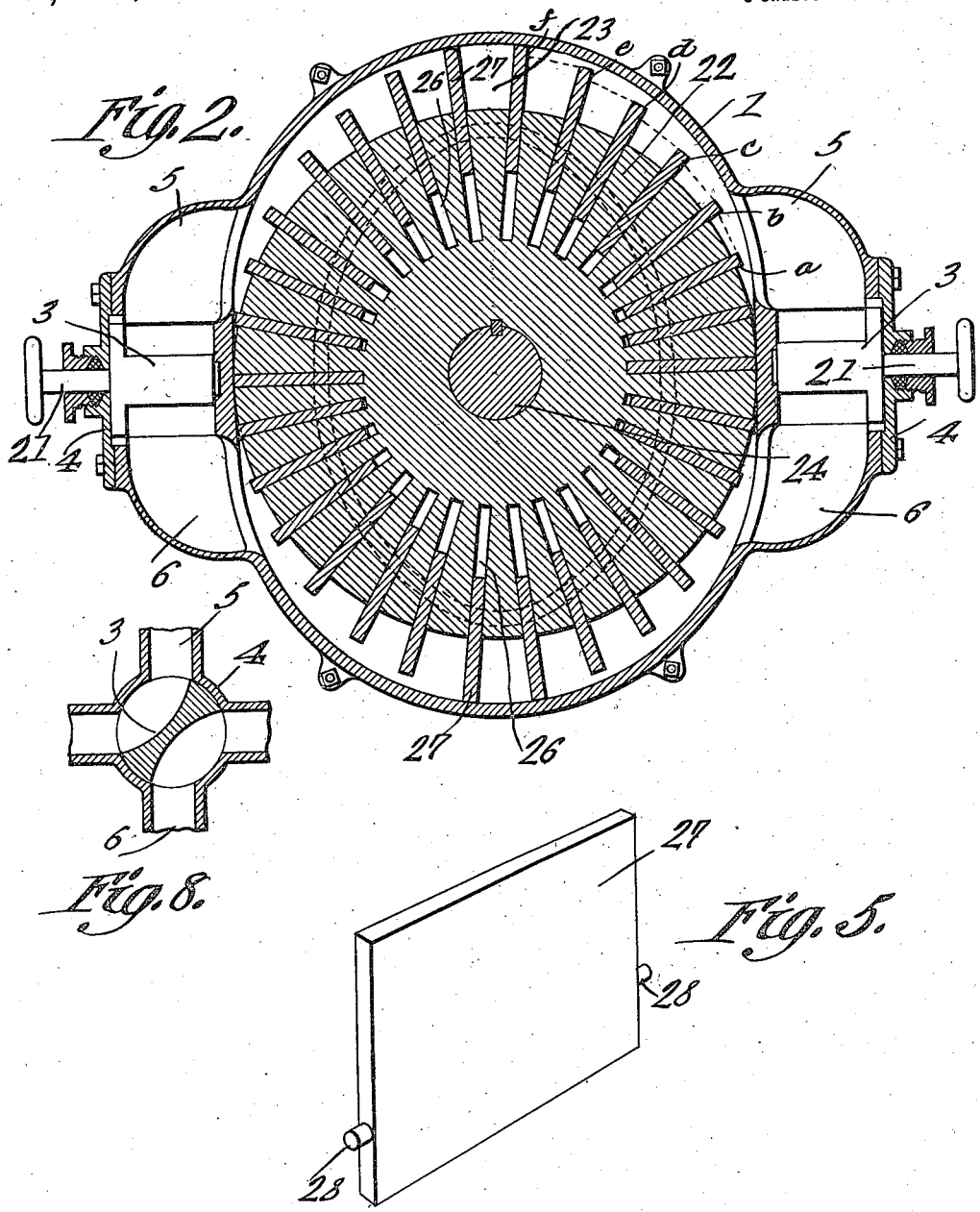

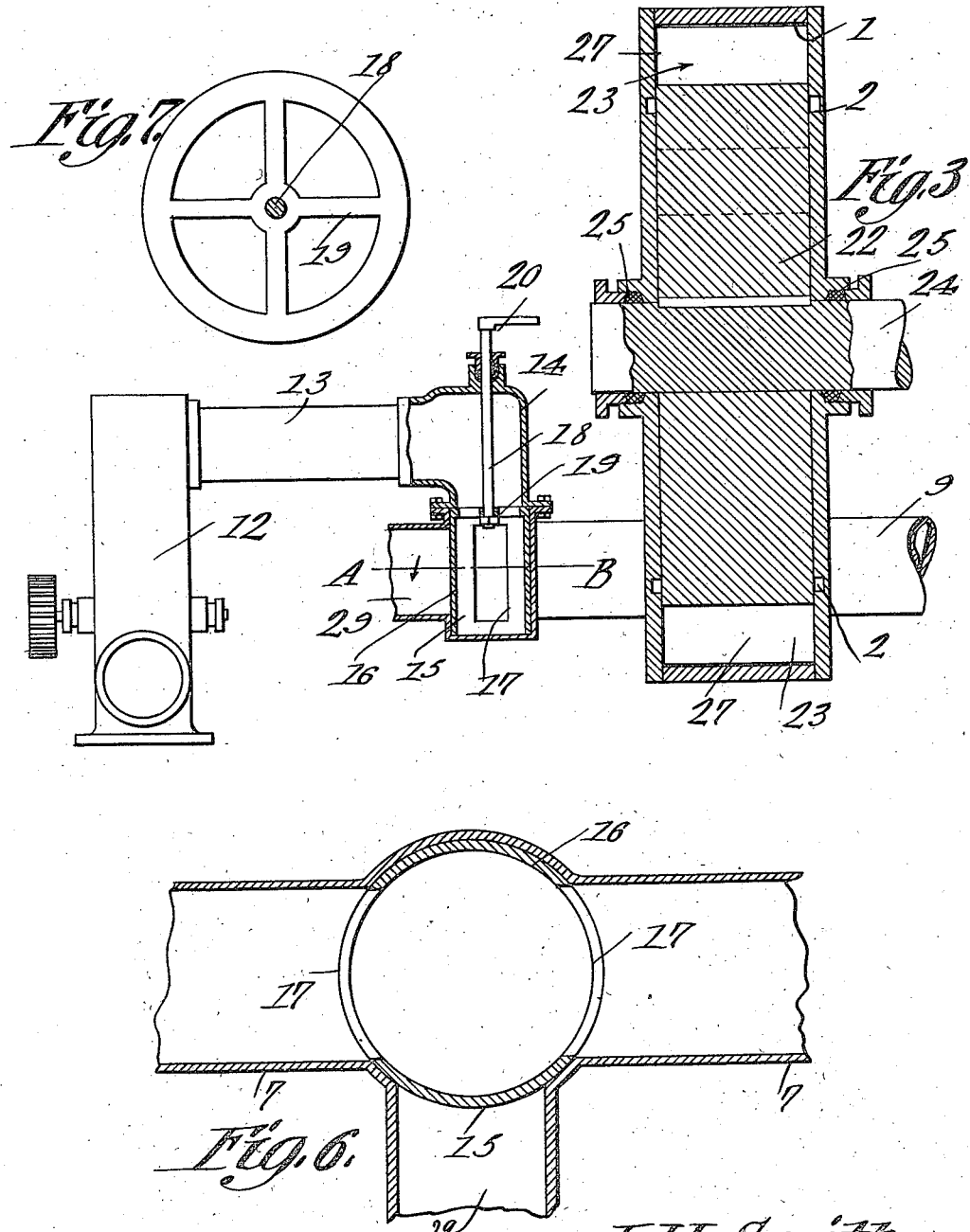

JOHN H. SMITH, OF RICHMOND, VIRGINIA, ASSIGNOR OF ONE-HALF TO B. AURELIUS GILL, OF RICHMOND, VIRGINIA.

TRANSMISSION FOR MOTOR-VEHICLES.

1,212,577.  Specification of Letters Patent.  Patented Jan. 16, 1917.

Application filed October 16, 1914. Serial No. 866,987.

*To all whom it may concern:*

Be it known that I, JOHN H. SMITH, a citizen of the United States, residing at Richmond, in the county of Henrico and State of Virginia, have invented a new and useful Transmission for Motor-Vehicles, of which the following is a specification.

This invention relates to transmission mechanism for motor vehicles, one of its objects being to utilize oil or other suitable fluid as a power transmitting medium, novel means being provided whereby the full power of the circulating liquid medium practically is utilized and a compact, efficient and easily controlled transmission system is produced.

A further object is to provide a rotor of novel form for receiving the impact of the circulating fluid, said rotor having a novel arrangement of piston whereby the area exposed to the action of the circulating medium is distributed annularly so that the total area exposed to the propelling fluid remains constant.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings the preferred form of the invention has been shown.

In said drawings:—Figure 1 is a plan view of the complete transmission system, the same being illustrated, to an extent, in diagram. Fig. 2 is an enlarged longitudinal section through the rotor and its casing. Fig. 3 is a transverse section through the rotor and its throttle valve, adjacent parts of the transmission system being shown in elevation. Fig. 4 is a longitudinal section through the casing of the rotor and showing one of the cam grooves utilized, the shafts of the rotor being shown in section. Fig. 5 is a detail view of one of the pistons. Fig. 6 is a section on the line A—B, Fig. 3. Fig. 7 is a plan view of the spider forming a part of the throttle. Fig. 8 is a section on line C—D, Fig. 1.

Referring to the figures by characters of reference 1 designates an elliptical casing of any preferred construction and each head of the casing has a cam or eccentric 2 which can be in the form of a groove formed in the head, the major axes of the head and of the eccentric being coincident and the same being likewise true of their minor axes, said major and minor axes of the eccentric being obviously shorter than the corresponding axes of the head. Located adjacent the terminals of the minor axis of the elliptical casing 1 are four-way turning valves 3 mounted within casings 4 and controlling the flow of fluid into spaced ports 5 and 6 opening into the casing 1. Each valve also controls the flow of fluid through pipes 7 and 8 preferably disposed adjacent opposite sides of the casing 1. The two pipes 8 extending from the two casings 4 merge into a common discharge pipe 9 which, in turn, discharge into a storage tank 10 of any suitable construction. This storage tank communicates, through an outlet pipe 11, with a pump casing 12, and said pump casing has an outlet pipe 13 discharging into the casing 14 of a throttle 15. The pipes 7 communicating with the casing 4 are extended in opposite directions from the casing 14 of the throttle. As shown particularly in Figs. 3 and 6 the throttle, which is in the form of a hollow cylinder 16 having opposed orifices 17, is provided with a stem 18 mounted for rotation within a spider 19, said stem projecting upwardly from the casing of the throttle and having a handle 20 of any suitable construction whereby the same can be operated readily. By means of this throttle, the flow of fluid from the pipe 13 into the distributing pipe 7 can be controlled.

The two valves 3 are provided with stems 21 and any suitable mechanism, not shown, may be provided for simultaneously actuating the valves. These valves are so positioned that both of them will be closed at the same time and, when one is positioned to establish communication between pipe 7 and port 5, the other valve is in the position to establish communication with the pipe 7 and port 6. When port 5 is in communication with the supply pipe 7, the port 6 adjacent thereto is in communication with the outflow pipe 8, and vice versa. Thus it will be seen that when the two valves 3 are simultaneously shifted out of closed position, fluid under pressure will, for example, enter the casing 1 through one of the ports 5 and through the port 6 adjacent the opposite side of the casing while the remaining ports 5 and 6 will be in communication with the outflow pipes 8. When the valves 3 are shifted to their reverse position, the ports which have previously been in communication with the outflow pipes 8 will be placed in communication with the supply pipes 7.

Mounted within the casing 1 is a cylindrical rotor 22, the diameter of which is substantially equal to the minor axis of the chamber within the casing 1, so that opposed crescent shaped pressure chambers 23 are thus provided between the rotor and opposed portions of the casing 1. The rotor is keyed or otherwise secured to a driven shaft 24 journaled within the head of the casing 1 and any suitable means such as glands 25, may be provided for preventing leakage through the bearings of the shaft.

The rotor 22 is formed with a plurality of radial slots 26 extending thereinto from its periphery and likewise extending throughout the width of the rotor. These slots are of uniform depth and each of them contains a slidable piston 27 provided with trunnions 28 which project into engagement with the cam grooves or eccentrics 2 formed within the heads of the casing 1. The eccentrics and the trunnions are so positioned relative to each other that as each piston passes the terminals of the major axis of the chamber within casing 1, it is brought into contact with the periphery of the casing, thus to divide the chamber 23 into non-communicating portions one of which contains the active fluid or fluid exerting a thrust against the rotor while the other portion contains the inactive fluid, or in other words, that portion of the fluid, which has exerted its force and is being returned to its reservoir or container 10. The parts are so proportioned, however, that when the pistons pass the terminals of the minor axis of the chamber within the casing, said pistons are completely retracted into their slots so as to permit the rotor to fit snugly against the walls of the casing at these points. The eccentric 2 is so shaped that during the operation of the rotor, the housed pistons will be gradually projected as they move away from the terminals of the minor axis of the chamber within the casing 1 until they ultimately engage the periphery of said chamber when they reach the terminals of the major axis thereof. Thus all of the pistons between these two points within the casing 1 are projected greater or less distances beyond the rotor and all are in position to receive pressure exerted by the motive fluid.

It will be seen by referring to Fig. 2 that the piston nearest the intake port 5 projects but a slight distance beyond the periphery of the rotor 22, this projecting portion presenting an effective impact receiving surface designated at $a$. The next piston in advance of this projecting portion $a$ extends still farther into the path of the motive fluid, and that portion thereof projecting beyond the path of movement of the impact receiving surface $a$ constitutes an additional impact receiving surface designated at $b$. Additional impact receiving surfaces have been indicated at $c$, $d$, $e$ and $f$; these various impact receiving surfaces extending from the outer edges of the respective pistons inwardly to the paths of movement of the next adjoining pistons and which paths have been indicated by dotted lines in Fig. 2. Thus it will be seen that the sum total of the impact receiving surfaces of the several pistons included in 90 degrees equals the length of the exposed portion of the piston at the major axis of the chamber in the casing 1. This arrangement of pistons in stepped relation, however, is advantageous as compared with the use of a single piston, in that pressure is distributed throughout the 90 degrees and by reason of the further fact that the surface exposed to the action of the motive fluid remains constant and does not vary, as would be the case should widely separated pistons be employed. Furthermore as the pressure within each pocket formed between two adjoining pistons is equal in all directions, it will be apparent that friction due to the radial movement of the pistons is materially reduced and, should one piston be provided to receive all of the pressure instead of the six pistons shown in the upper portion of Fig. 2, this one piston would be caused to bind with such force against the wall of the pocket within which it is mounted as to seriously interfere with the operation of the motor. In the present instance, however, the pressure is distributed among no less than six pistons in the upper portion of the rotor with the result that the friction to which any one piston is subjected is so reduced as to be negligible. It will be noted furthermore that while approximately six pistons are being subjected to pressure from the port 5, a corresponding number of pistons are being subjected to pressure from the port 6, these two applications of pressure offsetting each other so that the rotor becomes evenly balanced and is rendered practically a floating rotor, this being especially due to the fact that pressure is distributed through 90 degrees at diametrically opposed points in the casing 1.

The pump 12 may be of any desired form and may be driven in any manner desired from a hydrocarbon engine or the like.

Assuming that the pump 12 is in operation and that the throttle is turned so as to close communication between the pipe 13 and the distributing pipes 7, then communication will be set up from pipe 13 through the throttle to a by-pass 29 which opens into the return pipe 9. Consequently the action of the pump will result in withdrawing fluid from the tank 10 by way of pipe 11 and returning it to the tank by way of pipe 13, the casing 14, by-pass 29, and pipe 9. By now rotating the throttle valve so as to partly or entirely close communication with the by-pass 29, communication will be established between the pipe 13 and the distributing pipes 7 and, consequently, the circulating fluid, instead of returning to the tank 10 by way of by-pass 29, will be discharged into the distributing pipes 7 and thence into the valve casings 4. The valve 3, will, for example, direct the fluid from one of the casings 4 into the casing 1 in a clockwise direction from the port 5 and from the other casing 4 into the casing 1 from the port 6 at the opposite side of the casing 1. The fluid entering either of these ports 5 and 6 will press with equal force against all of the projecting portions of the pistons 27 located between the point of contact of the rotor with the casing 1 and the extremity of the major axis of the casing. As the chambers 23 within the casing 1 are filled with motive fluid, it will be seen that the pressure exerted by the pump upon the fluid contained within these chambers, will be transmitted undiminished in all directions and, consequently, the force exerted against all of the exposed impact receiving faces of said piston will be of the same ratio.

Whenever it is desired to slacken the speed of the rotor, it is merely necessary to partly cut off the supply of fluid from the pump to the distributing pipes 7, and whenever it is desired to reverse the rotor, it is merely necessary to reverse the valves 3.

By utilizing transmission mechanism such as described, gearing such as heretofore found necessary is dispensed with, the mechanism being, consequently, reduced in width while the control is rendered more efficient, inasmuch as the shaft can be driven at any intermediate speed merely by the manipulation of the throttle valve 15. The amount of pipe used and, consequently, the amount of friction, can be reduced to the minimum.

What is claimed is:

1. In a transmission for motor vehicles and the like, an elliptical casing having a pressure inlet adjacent each end of the minor axis thereof and a pressure outlet adjacent each end of said minor axis, a cylindrical rotor engaging the wall of the casing at each end of the minor axis of said casing, and between the pressure inlets and outlets, and a plurality of radially disposed pistons carried by the rotor and movable successively to positions to divide the interior of the casing into diametrically opposed pressure chambers each extending through approximately 90 degrees, there being a plurality of pistons disposed in stepped relation within each pressure chamber at all times during the actuation of the rotor.

2. In a transmission for motor vehicles and the like, an elliptical casing having a pressure inlet adjacent each end of the minor axis thereof and a pressure outlet adjacent each end of said minor axis, a cylindrical rotor engaging the wall of the casing at each end of the minor axis of said casing, and between the pressure inlets and outlets, and a plurality of radially disposed pistons carried by the rotor and movable successively to positions to divide the interior of the casing into diametrically opposed pressure chambers each extending through approximately 90 degrees, there being a plurality of pistons disposed in stepped relation within each pressure chamber at all times during the actuation of the rotor, there being elliptical guide channels within the side walls of the casing, projecting members on the pistons and working within said channels, a fluid forcing means, means for conducting fluid from said forcing means to the pressure inlet, and means for conducting fluid from the pressure outlets to said fluid forcing means.

In testimony that I claim the foregoing as my own, I have hereto affixed my signature in the presence of two witnesses.

JOHN H. SMITH.

Witnesses:
  M. E. McCarthy,
  Ivy E. Simpson.